W. A. HALL.
PROCESS FOR THE CONVERSION OF HEAVY HYDROCARBONS INTO LIGHTER HYDROCARBONS.
APPLICATION FILED JULY 24, 1914.
1,175,909.   Patented Mar. 14, 1916.
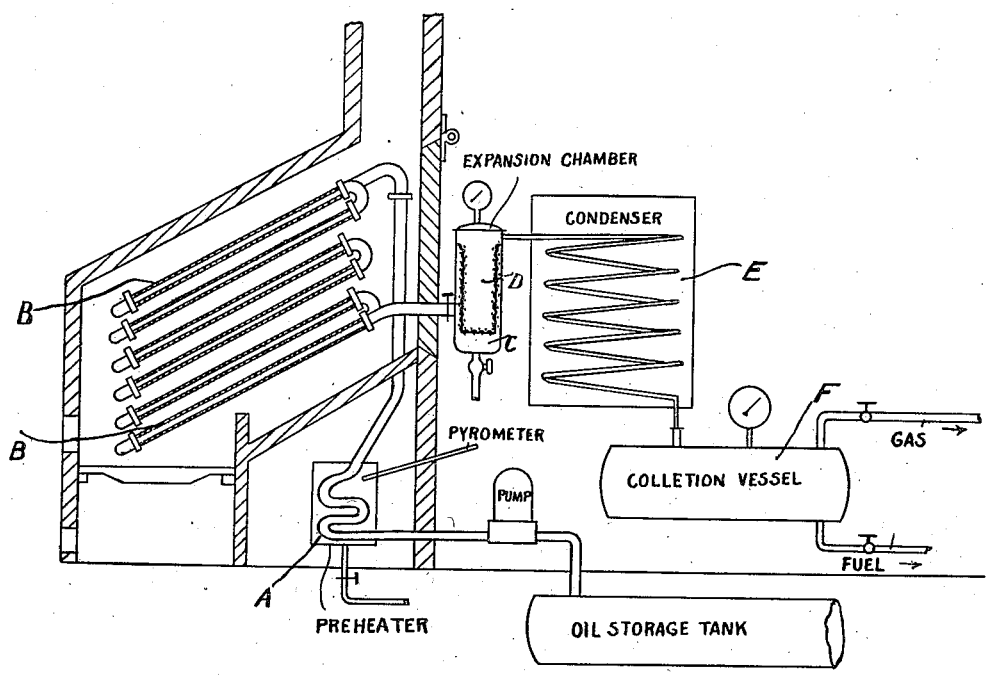

UNITED STATES PATENT OFFICE.

WILLIAM A. HALL, OF NEW YORK, N. Y.

PROCESS FOR THE CONVERSION OF HEAVY HYDROCARBONS INTO LIGHTER HYDROCARBONS.

1,175,909. Specification of Letters Patent. Patented Mar. 14, 1916.

Application filed July 24, 1914. Serial No. 852,965.

*To all whom it may concern:*

Be it known that I, WILLIAM AUGUSTUS HALL, a citizen of the United States Republic, and resident of New York, N. Y., United States of America, have invented a certain new and useful Improvement in Processes for the Conversion of Heavy Hydrocarbons Into Lighter Hydrocarbons, of which the following is a specification.

This invention relates to improvements in the hydrogenation of heavy hydrocarbons with the object of converting them into hydrocarbons of lower specific gravity and boiling point such as can be used successfully in internal combustion engines of the automobile type.

In the practice of other processes of hydrogenation known to me the hydrogenation of the oil has been effected by affixing to the hydrocarbon molecule additional hydrogen derived from some extraneous source, which may be free gaseous hydrogen, or producer gas, or nascent hydrogen from the decomposition of water, the affixation being usually accomplished by the well known catalytic action of nickel or other metal which will act in a similar manner, a process of this general character being claimed in my copending application 769,610, filed May 24, 1913. These processes have been found very expensive as free hydrogen is a costly material, and the N, CO and $CO_2$ content of producer or water gas has presented difficulties.

The improved process consists in subjecting the volatilized heavy hydrocarbon, in the absence of steam or any extraneous source of hydrogen, either in the form of water, steam or added hydrogen, to the action of heat and pressure in the presence of a catalyst capable of effecting the fixation of hydrogen to hydrocarbons, allowing the products to expand and thereby deposit carbon, and cooling the residual products to produce by condensation a liquid hydrocarbon containing less carbon than the said heavy hydrocarbon, and especially adapted for use in high speed internal combustion engines.

It has also been proposed to pass a mixture of oil and water or steam through tubes containing metallic nickel rods in a retort maintained at a dull red heat. My invention is distinguished from such a process in that I pass the vaporized oil through tubes containing rods of nickel or other hydrogenating catalyst, but with the addition thereto of no hydrogen, and no water or steam.

If the hydrocarbon oil is heated under a moderate pressure, say a pressure of about 5 atmospheres, to a temperature of upward of 600° C., in the presence of the catalyst, and in the absence of steam or any extraneous source of hydrogen, either in the form of water, steam or added hydrogen gas, an efficient conversion of the oil takes place, the oil being partially decomposed and gases set free, such gases being in turn decomposed by the heated catalyst with liberation of hydrogen which in a nascent state is to a considerable extent affixed to the condensable portion of the decomposed hydrocarbon oil.

The catalysts I employ are substances such as the metals, or oxids of the metals, nickel, cobalt, silver, palladium, chromium or manganese, which substances are hereinafter referred to under the term "catalytic body of the nickel type."

Apparatus suitable for the performance of the process is shown diagrammatically in the accompanying drawing.

As shown, the apparatus includes a preheater A for raising the temperature of the oil and to some extent volatilizing the same before it enters the tubular converter B, so that the gas may be produced at as early a stage in the process as possible.

The converter shown is constituted by a serpentine inclined metallic tube so arranged that the circulation is through the top section, then down and through the next, and so on to the bottom, the exposure being at first to the lowest temperature, which is at the top, and gradually increasing toward the bottom. In the tubular elements of the converter is placed the catalytic material which rests in contact with the heated walls of the tube. From the converter B the products are passed into an expansion chamber C where their temperature is somewhat reduced. The said expansion chamber C may be provided with a metallic gauze screen D, preferably of conical shape, which will collect and extract any loose carbon that may be set free (it being found that such carbon is most readily deposited at the point where expansion occurs and to the greatest extent if the pressure be suddenly reduced from that in the converter (about 5 atmospheres) down to atmospheric pressure). This loose carbon is of course a product of the decomposition and its extraction from the heavy oil to a large extent accounts for the reduction of the specific gravity.

It is to be noted that the pressure of the vapors drops materially, in passing from the converter B to the chamber C. This drop in pressure appears to aid materially in the deposition of free carbon in large quantities in the receptacle C. By causing the carbon to deposit in the receptacle C, instead of in the elements of the converter B, there is no danger of the converter being clogged up by means of this loose carbon.

It will be noted that the gases and vapors produced by the decomposition of the oil, will be caused to flow rather rapidly through the retort, and since the cross section of the space in the retort is rather small, owing to the fact that the metal rod therein takes up quite a large part of the space therein, the current of gases and vapors flowing through the retort will carry along all the free carbon, or soot-like material, consequently not much of this will deposit within the retort. After the pressure falls, and the gases enter the larger chamber C, most all the free carbon will deposit in the expansion chamber C, and on the gauze member D. Tarry matters will likewise be separated in the chamber C. From the said expansion chamber C the products are passed through a cooling condenser E and into a receiving tank F from which can be extracted any fixed gases that have not combined with the condensable portions. The condensate is found to be an entirely different product from the oil started with—it has a much lower specific gravity and boiling point and when redistilled and fractionated yields a large portion of volatile spirit eminently adapted for use in automobiles. For instance if the raw material used be "gas oil" (that being a refinery distillate having a boiling point above the boiling points of petrol and lamp oil) it will yield from 50 to 70% of a fuel of a specific gravity of about .765 with a boiling point which is lower than that of commercial petrol. The product of this process also contains a proportion of unsaturated hydrocarbons. The quantity of unsaturated hydrocarbons may vary more or less, but the quantity is always rather small, as compared with the products of some of the other processes with which I am familiar. Of course it is not necessary to redistil the condensate, as the fractionation can be effected by a dephlegmator situated between the converter and the condenser.

Having described my invention, I declare that what I claim and desire to secure by Letters Patent of the United States is:—

1. The herein described method of converting relatively heavy liquid hydrocarbons into lighter and more volatile hydrocarbons, which comprises the step of vaporizing said relatively heavy hydrocarbons, and causing a current of the vapors to flow, in the absence of extraneous hydrogen, and in the absence of free oxygen, in contact with a catalyst capable of effecting the fixation of hydrogen to hydrocarbons, said catalyst being maintained at a temperature not materially below 600° C., and said vapors being being maintained under pressure materially above atmospheric, thereafter allowing the products to expand into a separate expansion vessel, wherein the pressure is materially lower, and the speed of the gases is materially lower, than in the vessel containing the catalyst, whereby the bulk of the free carbon separates, and is deposited in said expansion vessel, and thereafter cooling the residual products, to produce by condensation, a liquid hydrocarbon containing less carbon than said relatively heavy hydrocarbon and especially adapted for use in high speed internal combustion engines.

2. The herein described method of converting relatively heavy hydrocarbons into lighter and more volatile hydrocarbons, suitable for use in internal combustion engines, which process comprises vaporizing said relatively heavy hydrocarbons alone, causing the vapors thereby produced, in the absence of extraneous hydrogen, and in the absence of free oxygen, to flow rapidly through a confined space under a pressure of several atmospheres, at a temperature sufficiently high to crack at least a portion of said hydrocarbon, in contact with a catalytic body, allowing the vapors so produced to expand into a separate expansion vessel, wherein the pressure is materially lower, than in the receptacle containing the catalytic body, and wherein the rate of flow of the vapors is lower than in the receptacle containing the catalytic body, whereby free carbon will be deposited in said expansion vessel, and thereafter cooling the vapors to condense liquid hydrocarbons.

3. The herein described method of converting relatively heavy liquid hydrocarbons into lighter and more volatile hydrocarbons adapted for use in high speed internal combustion engines, consisting in vaporizing the relatively heavy hydrocarbons, and subjecting the vapors, under pressure, in the absence of extraneous hydrogen, and in the absence of free oxygen, to the action of a catalyst capable of effecting the fixation of hydrogen to hydrocarbons at a temperature sufficiently high to cause the separation of free carbon, allowing the products to expand into a separate expansion vessel, wherein a pressure is maintained, considerably lower than the pressure in the receptacle containing the catalyst, whereby the non-volatile materials are separated in said expansion vessel, and thereafter cooling the residual products, to produce by condensation, a liquid containing less carbon than the relatively heavy hydrocarbons employed.

4. In the treatment of hydrocarbons, of relatively high boiling points, for the production of hydrocarbons of lower boiling points, the step of passing a current of vaporized hydrocarbons, at a cracking temperature, and in the absence of extraneous hydrogen, in contact with a hydrogenating catalyst, under a pressure of several atmospheres.

5. The step of passing a current of hydrocarbon vapors under a pressure materially above atmospheric, in contact with a nickel catalyst, at a temperature sufficiently high to liberate free carbon, in the absence of extraneous hydrogen.

6. In the production of motor fuel from heavier hydrocarbons, the step of passing hydrocarbon vapors alone into contact with a catalytic, at a temperature above 600° C., under pressure materially above atmospheric.

7. The herein described method of converting relatively heavy liquid hydrocarbons into lighter and more volatile hydrocarbons, which comprises the step of vaporizing said relatively heavy hydrocarbons, and causing a current of the vapors to flow, in the absence of extraneous hydrogen, and in the absence of free oxygen, in contact with a catalyst capable of effecting the fixation of hydrogen to hydrocarbons, said catalyst being maintained at a temperature above about 600° C., and said vapors being maintained under pressure materially above atmospheric, thereafter allowing the products to expand into a separate expansion vessel, wherein the pressure is materially lower, and the speed of the gases is materially lower, than in the vessel containing the catalyst, passing the gases and vapors while at said lower pressure, through a device capable of removing free carbon, and thereafter cooling the residual products, to produce by condensation, a liquid hydrocarbon containing less carbon than said relatively heavy hydrocarbon and especially adapted for use in high speed internal combustion engines.

8. The herein described method of converting relatively heavy hydrocarbons into lighter and more volatile hydrocarbons, suitable for use in internal combustion engines, which process comprises vaporizing said relatively heavy hydrocarbons alone, causing the vapors thereby produced, without the addition of other gases or vapors, to flow rapidly through a confined space under superatmospheric pressure, and at a temperature sufficiently high to cause the liberation of free carbon, while in contact with a catalytic body, allowing the vapors so produced to expand into a separate expansion vessel, wherein the pressure is materially lower than in the receptacle containing the catalytic body, and wherein the rate of flow of the vapors is lower than in the receptacle containing the catalytic body, and passing the gases and vapors through a separating medium.

9. In the production of motor fuel, the step of suddenly lowering the pressure of a flowing mixture containing gases and vapors and containing suspended particles of free carbon carried by said mixture, while causing said gases and vapors to enter an expansion vessel, wherein the speed of flow of the gases and vapors is materially decreased.

10. A process of converting heavy hydrocarbon oils into hydrocarbons of lower boiling points which comprises passing the vapors of the hydrocarbons to be treated, under pressure materially above atmospheric and in the absence of steam, over a substance capable of producing a catalytic action, while maintaining said substance at a temperature approximating a red heat.

11. A process of converting heavy petroleum oils into hydrocarbons of lower boiling points which comprises passing the vapors of the hydrocarbons to be treated, under superatmospheric pressure and in the absence of steam, over a hydrogenating catalyst while maintaining said catalyst at a temperature approximating a red heat.

12. A process of converting heavy hydrocarbon oils into hydrocarbon oils having lower boiling points, which comprises passing the vapors of said heavy hydrocarbon oils, under a pressure materially above atmospheric, and in the absence of steam, over a catalyst, while maintaining said catalyst at a temperature approximating a red heat.

13. In the manufacture of motor fuel from hydrocarbon oils of which at least portions have boiling points materially higher than those of ordinary gasolene, the herein described improvement which comprises passing such oil, in the form of a flowing current, in the substantial absence of extraneous water, through a coil maintained at a temperature not materially below 500° C., while at a pressure sufficiently low to allow vaporization, but materially above atmospheric, and thereafter rapidly lowering the pressure of the flowing mixture containing gases and vapors and containing suspended particles of free carbon carried by said mixture, and causing said gases and vapors to enter an expansion vessel, wherein the speed of flow of the gases and vapors is materially decreased.

14. A process of converting heavy hydrocarbon oils into hydrocarbons of lower boiling points which comprises passing the vapors of the hydrocarbons to be treated, under a pressure of several atmospheres, in the absence of steam, over a metallic substance capable of producing a catalytic action, while maintaining said substance at a temperature capable of cracking the heavy oils.

15. A process of converting lamp oils or other hydrocarbons into hydrocarbons of lower boiling points, which comprises passing the vapors of the hydrocarbons to be treated, under a pressure of several atmospheres, over a catalytic metal maintained at a temperature at which said catalytic metal possesses catalytic activity.

16. A process of converting heavy hydrocarbons into hydrocarbons of lower boiling points which comprises passing the vapors of said hydrocarbons, under superatmospheric pressure and in the absence of steam or added hydrogen over a substance capable of producing a catalytic action, while maintained at a temperature capable of cracking oils.

17. A process of converting heavy hydrocarbons into hydrocarbons of lower boiling points, which comprises passing the vapors of said heavy hydrocarbons in the absence of steam or other extraneous hydrogen, under superatmospheric pressure, over a "catalytic body of the nickel type," at a temperature approximating a red heat, allowing the products of the reaction to expand to a lower pressure, and removing the solid materials from the vaporous products.

18. In the manufacture of motor fuel from hydrocarbon oils of which at least portions have boiling points materially higher than those of ordinary gasolene, the step of passing such an oil in the form of a flowing current, in the substantial absence of extraneous water, through a coil maintained at a temperature not materially below 500° C., while at a pressure sufficiently low to allow vaporization, but materially above atmospheric.

In testimony whereof I have signed my name to this specification in the presence of two subscribing witnesses.

WILLIAM A. HALL.

Witnesses:
ALFRED S. BURBEY,
O. J. WORTH.